United States Patent
Dionne et al.

(10) Patent No.: US 10,465,752 B2
(45) Date of Patent: Nov. 5, 2019

(54) DRIVETRAIN PROVIDED WITH A CVT

(71) Applicant: TRANSMISSION CVTCORP INC., Sainte-Julie (CA)

(72) Inventors: Jean-François Dionne, St. Hubert (CA); Jean-Robert Desmeules, Montreal (CA); Rémi Tremblay, Sainte-Julie (CA)

(73) Assignee: TRANSMISSION CVTCORP INC., Sainte-Julie, Quebec (CA)

( * ) Notice: Subject to any disclaimer, the term of this patent is extended or adjusted under 35 U.S.C. 154(b) by 268 days.

(21) Appl. No.: 15/522,887

(22) PCT Filed: Oct. 30, 2015

(86) PCT No.: PCT/CA2015/051111
§ 371 (c)(1),
(2) Date: Apr. 28, 2017

(87) PCT Pub. No.: WO2016/074071
PCT Pub. Date: May 19, 2016

(65) Prior Publication Data
US 2018/0274596 A1  Sep. 27, 2018

Related U.S. Application Data

(60) Provisional application No. 62/077,359, filed on Nov. 10, 2014.

(51) Int. Cl.
| | | |
|---|---|---|
| *F16H 37/02* | (2006.01) | |
| *F16D 13/58* | (2006.01) | |
| *F16D 13/76* | (2006.01) | |
| *F16H 37/08* | (2006.01) | |
| *F16H 3/00* | (2006.01) | |
| *F16H 15/38* | (2006.01) | |

(52) U.S. Cl.
CPC ............ *F16D 13/58* (2013.01); *F16D 13/76* (2013.01); *F16H 37/021* (2013.01); *F16H 37/086* (2013.01); *F16H 3/006* (2013.01); *F16H 15/38* (2013.01); *F16H 2037/028* (2013.01); *F16H 2037/088* (2013.01)

(58) Field of Classification Search
None
See application file for complete search history.

(56) References Cited

U.S. PATENT DOCUMENTS

| | | | |
|---|---|---|---|
| 8,771,116 B2 * | 7/2014 | Triller | F16H 37/021 474/72 |
| 9,765,869 B2 * | 9/2017 | Holmes | F16H 37/021 |

FOREIGN PATENT DOCUMENTS

| | | |
|---|---|---|
| CN | 1625663 | 8/2005 |
| CN | 103492759 | 1/2014 |

(Continued)

*Primary Examiner* — Dirk Wright
(74) *Attorney, Agent, or Firm* — Fay Kaplun & Marcin, LLP

(57) ABSTRACT

A drivetrain for connection between the output of a prime mover and the input of a final drive is described herein. The drivetrain comprises a CVT including an input connected to the output of the prime mover and an output; a power mixer having a first input connected to the output of the prime mover, a second input coupled to the output disk of the CVT and an output; a three-speed transmission having an input connected to the output of the power mixer and an output connected to the input of the final drive.

15 Claims, 15 Drawing Sheets

(56) References Cited

FOREIGN PATENT DOCUMENTS

| WO | 2008/022455 | 2/2008 |
|----|-------------|--------|
| WO | 2011/113153 | 9/2011 |
| WO | 2012/135936 | 10/2012 |
| WO | 2012/145821 | 11/2012 |

* cited by examiner

DRIVETRAIN PROVIDED WITH A CVT

FIELD

The present disclosure generally relates to vehicle drivetrains. More specifically, the present disclosure is concerned with a drivetrain provided with a Continuously Variable Transmission (CVT).

BACKGROUND

CVTs are well known transmission mechanisms that can change trough an infinite number of gear ratios between upper and lower limits. Toroidal CVTs, which are also well known, include a disk and roller arrangement that transmits power between the disks, wherein one disk is the input and the other disk is the output. Such a transmission is used when transmission ratios have to be finely adjusted.

However, the ratio range required on a vehicle is often such that the size required for a CVT to cover the entire ratio range would be so large that it would be impractical to position it in some vehicle.

DETAILED DESCRIPTION

Figure 1:
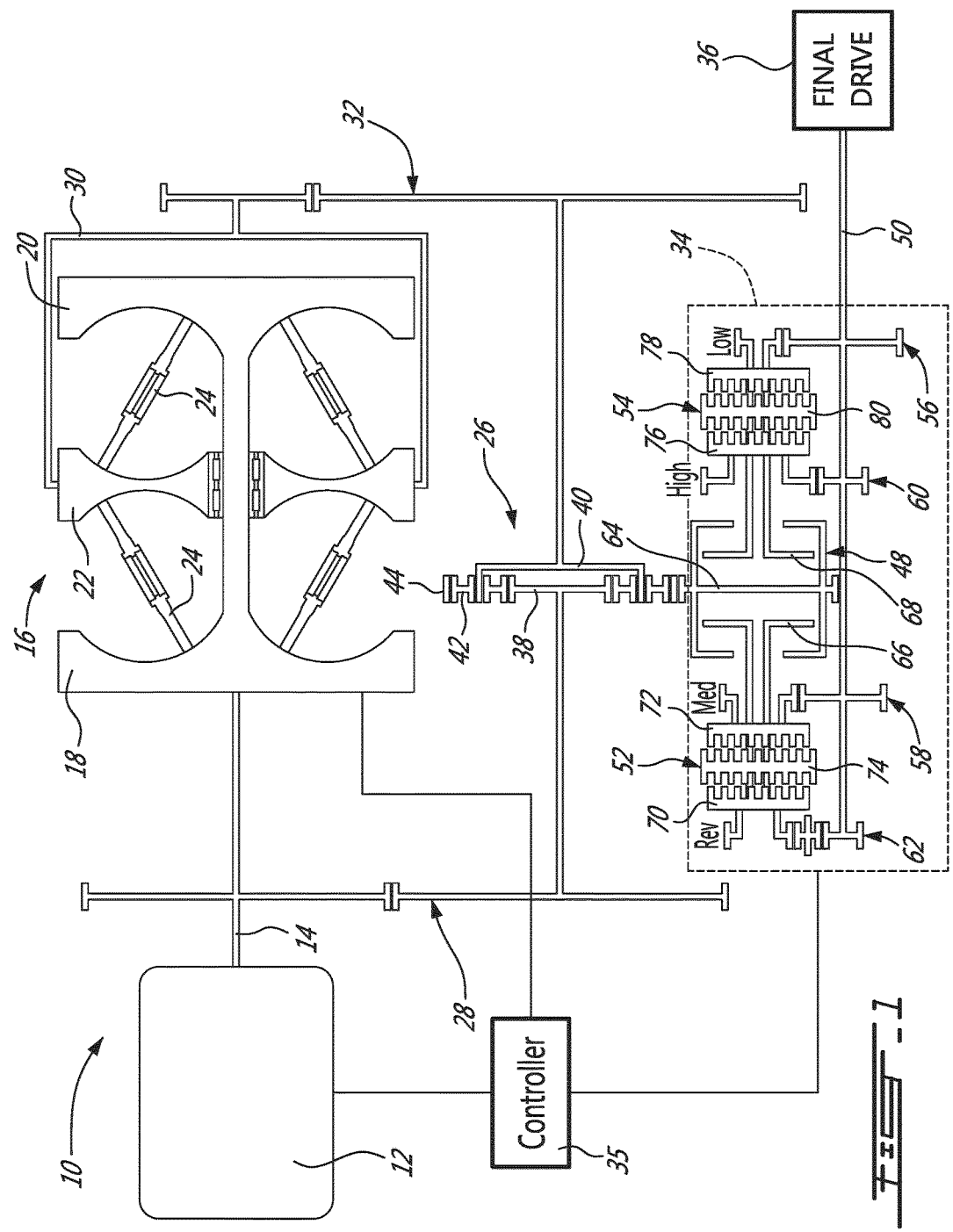
FIG. 1 is a schematic bloc diagram of a drivetrain including a CVT according to a first illustrative embodiment the drivetrain being shown in a neutral configuration.

An object is generally to provide an improved drivetrain provided with a CVT.

More specifically, in accordance to an illustrative embodiment, there is provided a drivetrain for connection between the output of a prime mover and the input of a final drive. The drivetrain comprising a CVT including an input connected to the output of the prime mover and an output and a transmission having an input connected to the output of the CVT and an output connectable to the input of the final drive; the transmission including first and second cascading selection mechanisms provided between the input of the transmission and the input of the final drive. The first and second cascading selection mechanisms are so configured and controlled that the position of the second selection mechanism can be changed by the controller depending on the next desirable configuration.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "prime mover" is to be construed herein and in the appended claims as an internal combustion engine a turbine engine, or any other mechanical power production element or assembly.

It is to be noted that while the expression "Toroidal CVT", standing for Continuously Variable Transmission is used herein to describe a dual-cavity full toroidal CVT, this expression is to be construed herein and in the appended claims as any type of toroidal CVT such as, for example, half-toroidal CVT and single cavity toroidal CVT.

It is to be noted that the expression "overdrive" when used herein in the context of a CVT, is to be construed herein and in the appended claims as a condition where the CVT ratio is such that the CVT output speed is higher than the CVT input speed.

It is to be noted that the expression "underdrive" when used herein in the context of a CVT, is to be construed herein and in the appended claims as a condition where the CVT ratio is such that the CVT output speed is lower than the CVT input speed.

It will also be noted that the expressions "fixed disk", when used herein and in the appended claims in the context of clutch technology, may be viewed as any element or group of elements constituting a clutch driving member. Similarly, the expressions "movable disk", when used herein and in the appended claims in the context of clutch technology, may be viewed as any element or group of elements constituting a clutch driven member.

It is to be noted that the term "drivetrain", used herein and in the appended claims, are to be construed as the intervening mechanism by which power is transmitted from a prime mover to a final drive as well as this mechanism plus the prime mover.

The expressions "connected" and "coupled" are interchangeable and should be construed herein and in the appended claims broadly so as to include any cooperative or passive association between mechanical parts or components. For example, such parts may be assembled together by direct coupling or connection, or indirectly coupled or connected using further parts. The coupling and connection can also be remote, using for example a magnetic field or else.

The expression "input", without reference to a specific component such as a shaft, should be construed herein and in the appended claims, as including any movable part of an object, an assembly, a system or a mechanism that is used to receive a mechanical work from same or from another assembly, system or mechanism. Similarly, the expression "output" should be construed as including a similar part that is used to transfer a mechanical work.

The expression "gear ratio" should be construed herein and in the appended claims broadly as meaning the ratio between the speed of rotation at the input of a machine, system or assembly to that of the output thereof.

Other objects, advantages and features of the drivetrain provided with a CVT will become more apparent upon reading of the following non-restrictive description of illustrative embodiments thereof, given by way of example only with reference to the accompanying drawings.

Generally stated, illustrative embodiments describe a drivetrain for connection between the output of a prime mover and the input of a final drive; the drivetrain comprising a CVT and a transmission which is provided with first and second cascading selection mechanisms where the position of the second selection mechanism can be changed by a controller depending on the next desirable configuration.

Turning now more specifically to FIG. 1 of the appended drawings, a drivetrain 10 according to an illustrative embodiment will be described.

The drivetrain 10 includes a prime mover 12 provided with an output shaft 14 and a dual-cavity toroidal CVT 16 having two interconnected input disks 18 and 20 connected to the shaft 14 of the prime mover 12, an output disk 22 and six rollers 24 (only four shown) provided between the output disk 22 and the input disks 18 and 20. The CVT 16 is so configured as to provide a primary continuous primary range of gear ratios between its input and output.

The drivetrain 10 also includes a power mixer 26 coupled both i) to the shaft 14 of the prime mover 12 via a gear train 28 and ii) to the output disk 22 of the CVT 16 via an output drum 30 and a gear train 32. The drivetrain further includes a three-speed transmission 34 having an input coupled to the power mixer 26 and an output coupled to the final drive 36, for example the differential of a vehicle.

A controller 35 is connected to the prime mover 12, the CVT 16 and the transmission 34 to receive data therefrom and/or control these elements.

It is to be noted that since the operation of a toroidal CVT is believed to be well known to one skilled in the art, it will not be explained herein, for concision purpose.

The power mixer 26 is illustrated herein as a planetary gear train provided with a sun 38 defining a first input connected to the prime mover via the gear train 28, a planet carrier 40, associated with planets 42 and defining the second input connected to the output of the CVT 16 via the gear train 32 and a ring 44 defining the output of the power mixer 26 and connected to the transmission 34.

Accordingly, as will be obvious to one skilled in the art, the speed of the ring 44 is a function of the speed of its first and second inputs and of the gear ratio between the various gears of the planetary gear arrangement.

One skilled in the art will also understand that the purpose of the power mixer 26 is to generate an output that is a combination of its two inputs. Accordingly, other mechanical arrangements could be used. It is to be noted that it is believed within the reach of one skilled in the art to determine the various gear ratios of the power mixer depending on the mechanical requirements of the drivetrain.

The three-speed transmission 34 includes an three-position friction clutch 48 having an input coupled to the output of the power mixer 26, an output shaft 50 coupled to the final drive 36, first and second three-position dog clutches 52 and 54, a low-speed gear train 56, a medium-speed gear train 58, a high-speed gear train 60 and a reverse gear train 62.

The three-position friction clutch 48 and the three-position dog clutches 52, 54 may be viewed as first and second cascading selection mechanisms since they select through which gear train the power is transferred from its input to its output.

The clutch 48 includes a fixed disk 64 connected to the ring gear 44 of power mixer 26, a first movable disk 66 coupled to the first dog clutch 52 and a second movable disk 68 coupled to the second dog clutch 54.

The first dog clutch 52 includes a first fixed disk 70 coupled to the reverse gear train 62, a second fixed disk 72 coupled to the medium-speed gear train 58 and a movable disk 74 coupled to the movable disk 66 of the friction clutch 48.

The second dog clutch 54 includes a first fixed disk 76 coupled to the high-speed gear train 60, a second fixed disk 78 coupled to the low-speed gear train 56 and a movable disk 80 coupled to the movable disk 68 of the friction clutch 48.

The gear trains 56-62 all include a respective gear mounted to the output shaft 50.

Accordingly, power is transferred from the output of the power mixer 26 to the final drive 36 a) via the reverse gear train 62 when the movable disk 66 is engaged to the fixed disk 64 and the movable disk 74 is engaged with the fixed disk 70; b) via the medium-speed gear train 58 when the movable disk 66 is engaged to the fixed disk 64 and the movable disk 74 is engaged with the fixed disk 72; c) via the high-speed gear train 60 when the movable disk 68 is engaged to the fixed disk 64 and the movable disk 80 is engaged with the fixed disk 76; and d) via the low-speed gear train 56 when the movable disk 68 is engaged to the fixed disk 64 and the movable disk 80 is engaged with the fixed disk 78.

One skilled in the art will understand that, thanks to the cascading relationship of the first and second selecting mechanisms and since the medium-speed gear trains 58 is selected from a different dog clutch than the low and high-speed gear trains 56 and 60, the controller 35, anticipating the next likely configuration change, may control the dog clutches 52 and 54 accordingly as will be described hereinbelow.

One skilled in the art will understand that FIG. 1 is very schematic and that many other elements are required for the drivetrain 10 to properly operate.

Turning now to FIGS. 2 to 7 of the appended drawings, the operation of the drivetrain 10 will be described.

Figure 2:
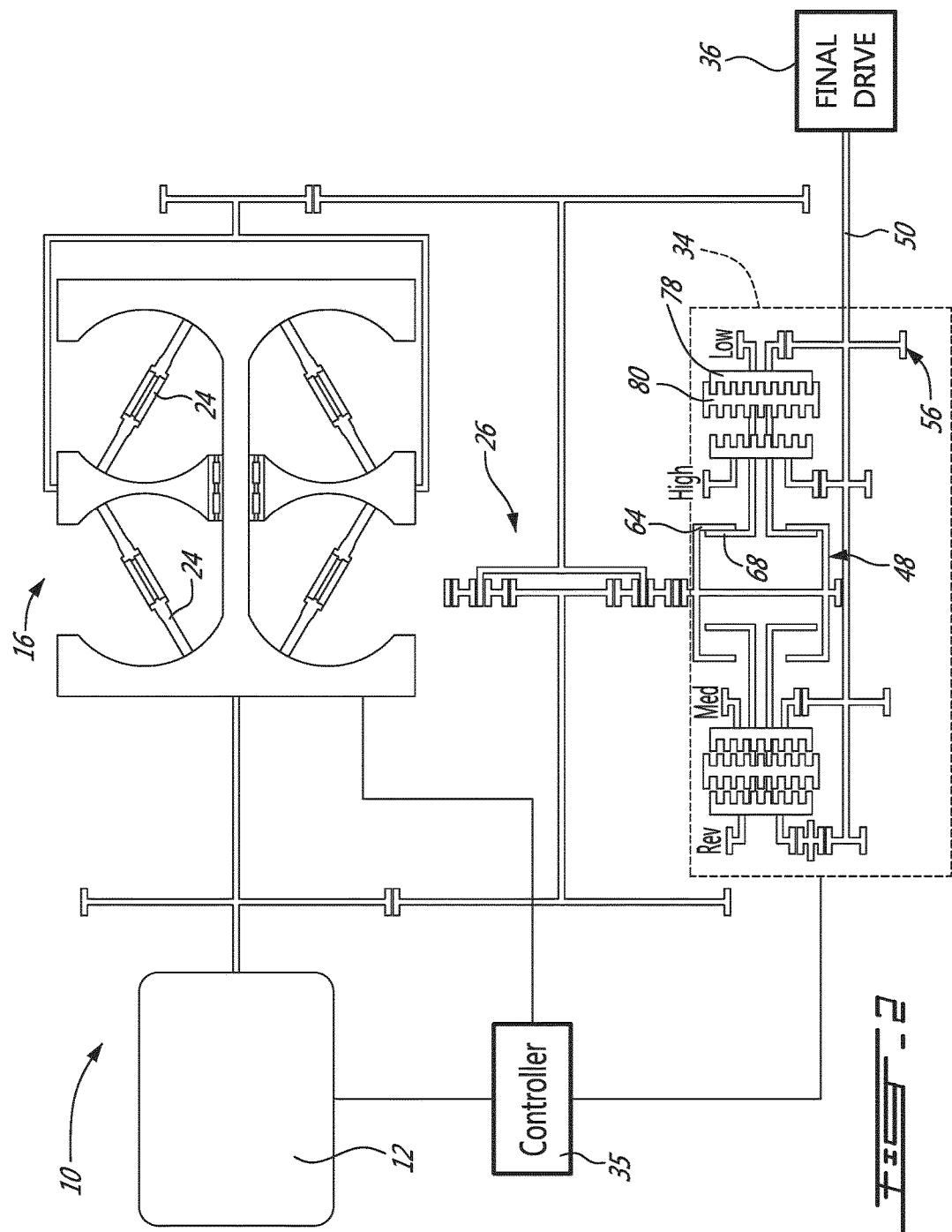
FIG. 2 is a schematic bloc diagram of the drivetrain of FIG. 1 shown in a low-speed configuration.

FIG. 2 of the appended drawings illustrates the drivetrain 10 in a low-speed mode. Indeed, power is transferred from the power mixer 26 to the final drive 36 via the low-speed gear train 56 since the movable disk 68 is engaged to the fixed disk 64 and the movable disk 80 is engaged with the fixed disk 78.

In other words, the low-speed gear train 56 is so configured as to selectively provide, in cooperation with the CVT 16, a first secondary continuous gear ratio between the output of the prime mover 12 and the final shaft 50.

The rollers 24 of the CVT are shown in an underdrive position. The user may thus increase the speed of the output shaft 50 by either increase the speed of the prime mover 12 and/or changing the ratio of the CVT by changing the position of the rollers 24.

Figure 3:
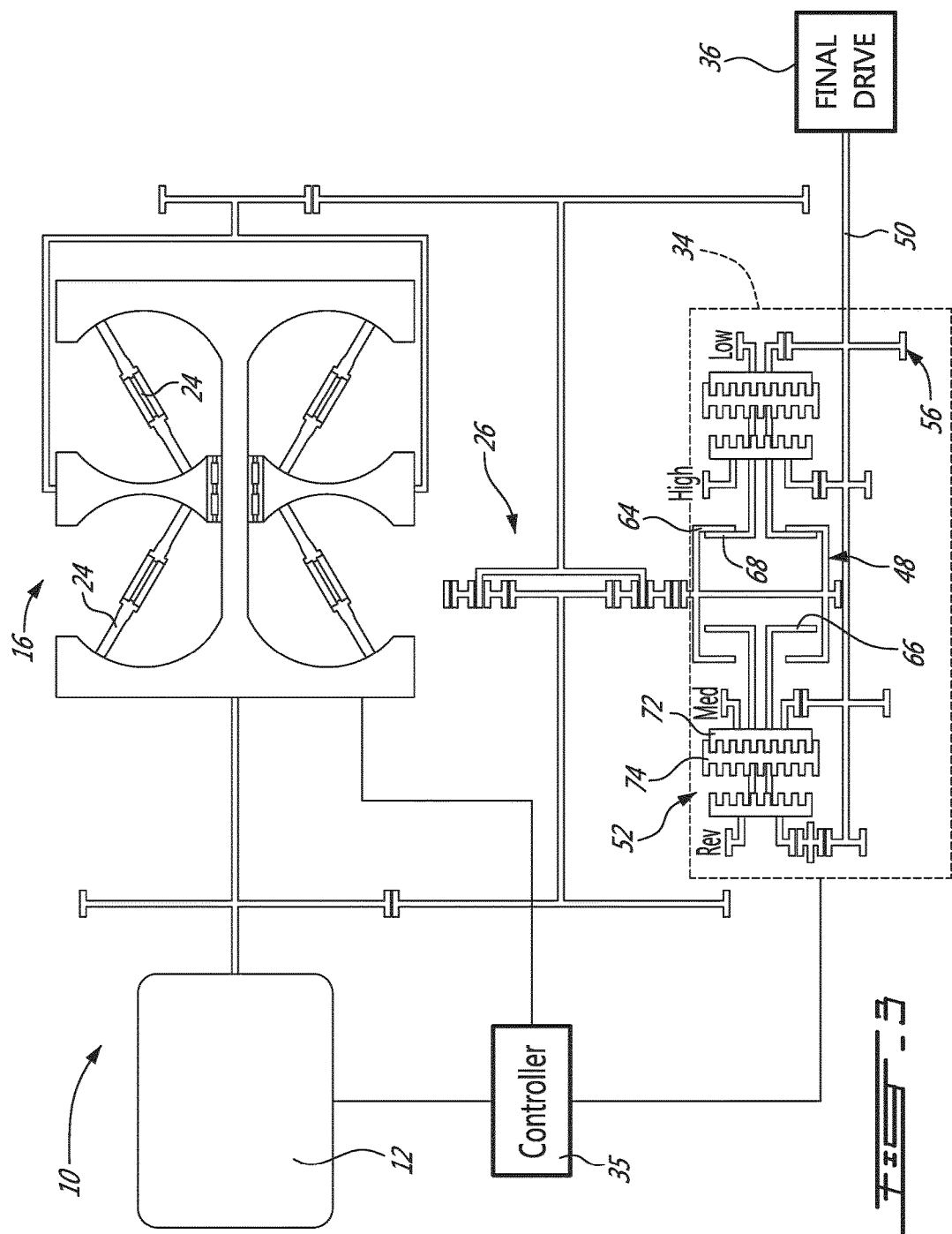
FIG. 3 is a schematic bloc diagram of the drivetrain of FIG. 1 shown at the maximal speed of the low-speed configuration.

In FIG. 3, the rollers 24 have been moved to an overdrive position to thereby increase the speed of the output shaft 50 without changing the speed of the output shaft of the prime mover 12. Since the next logical step to keep increasing the speed of the output shaft 50 is to change from the low-speed range to the medium-speed range, the movable disk 74 of the dog clutch 52 is placed in contact with the fixed disk 72 to thereby prepare for the next likely gear change. Note that since the movable disk 68 is still engaged to the fixed disk 64, the low gear train 56 is still in operation.

The next operation is to progressively engage the movable disk 66 to the fixed disk 64 while progressively disengaging the movable disk 68 from the fixed disk 64. Since the ratio of the CVT 16 can be changed simultaneously, it is possible to achieve such a speed change without jolts.

Figure 4:
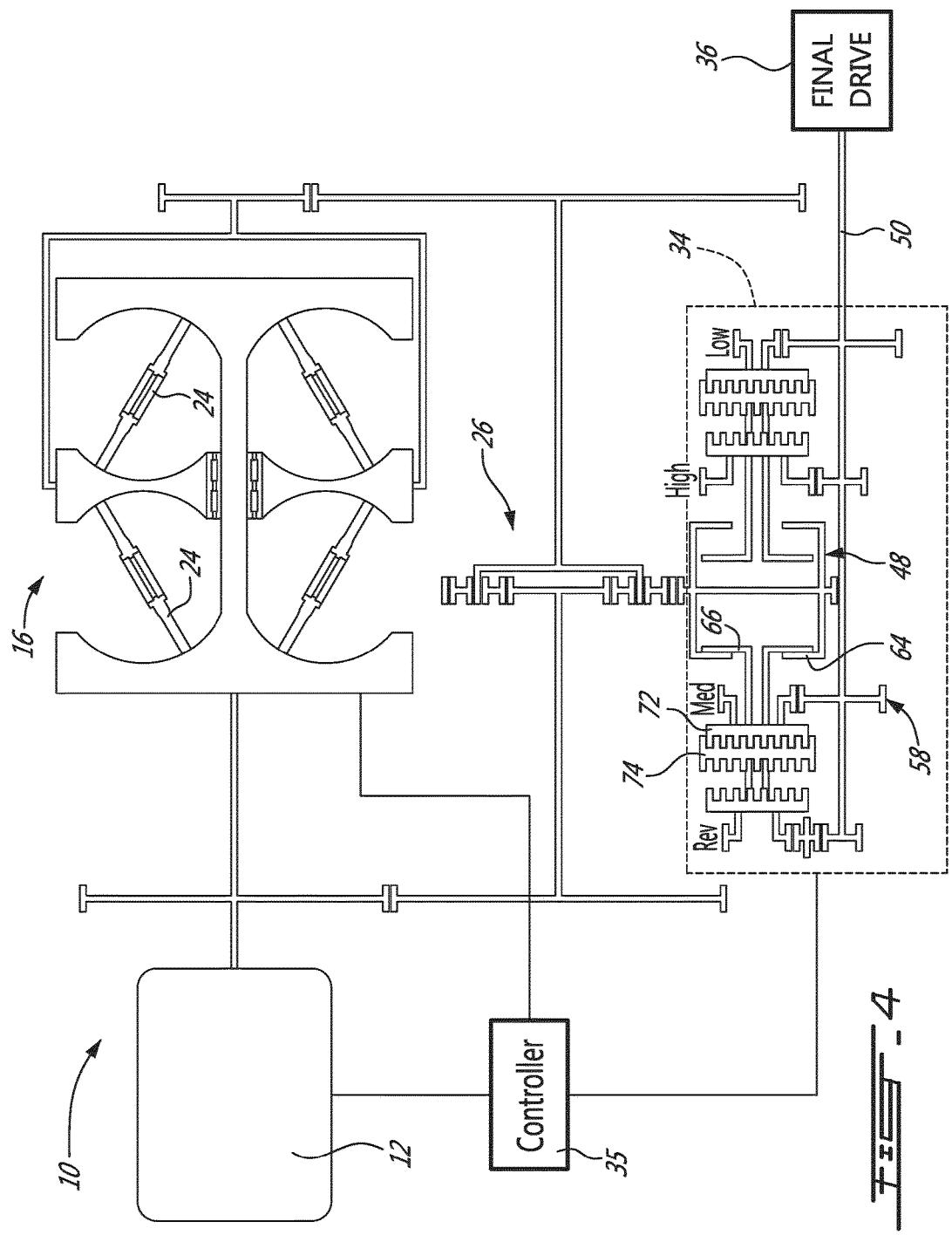
FIG. 4 is a schematic bloc diagram of the drivetrain of FIG. 1 shown in a medium-speed configuration.

FIG. 4 illustrates the drivetrain 10 when it is in the medium-speed mode. The movable disk 74 is engaged to the fixed disk 72, the movable disk 66 is engaged to the fixed disk 64 and the rollers 24 have returned to the underdrive position. It is to be understood that the exact position of the rollers 24 depends on the speed of the vehicle and is determined by the controller. Power is thus transferred to the output shaft 50 via the medium-speed gear train 58. The user may thus increase the speed of the output shaft 50 by either increase the speed of the prime mover 12 and/or changing the ratio of the CVT by changing the position of the rollers 24.

In other words, the medium-speed gear train 58 is so configured as to selectively provide, in cooperation with the CVT 16, a second secondary continuous gear ratio between the output of the prime mover 12 and the final shaft 50.

Figure 5:
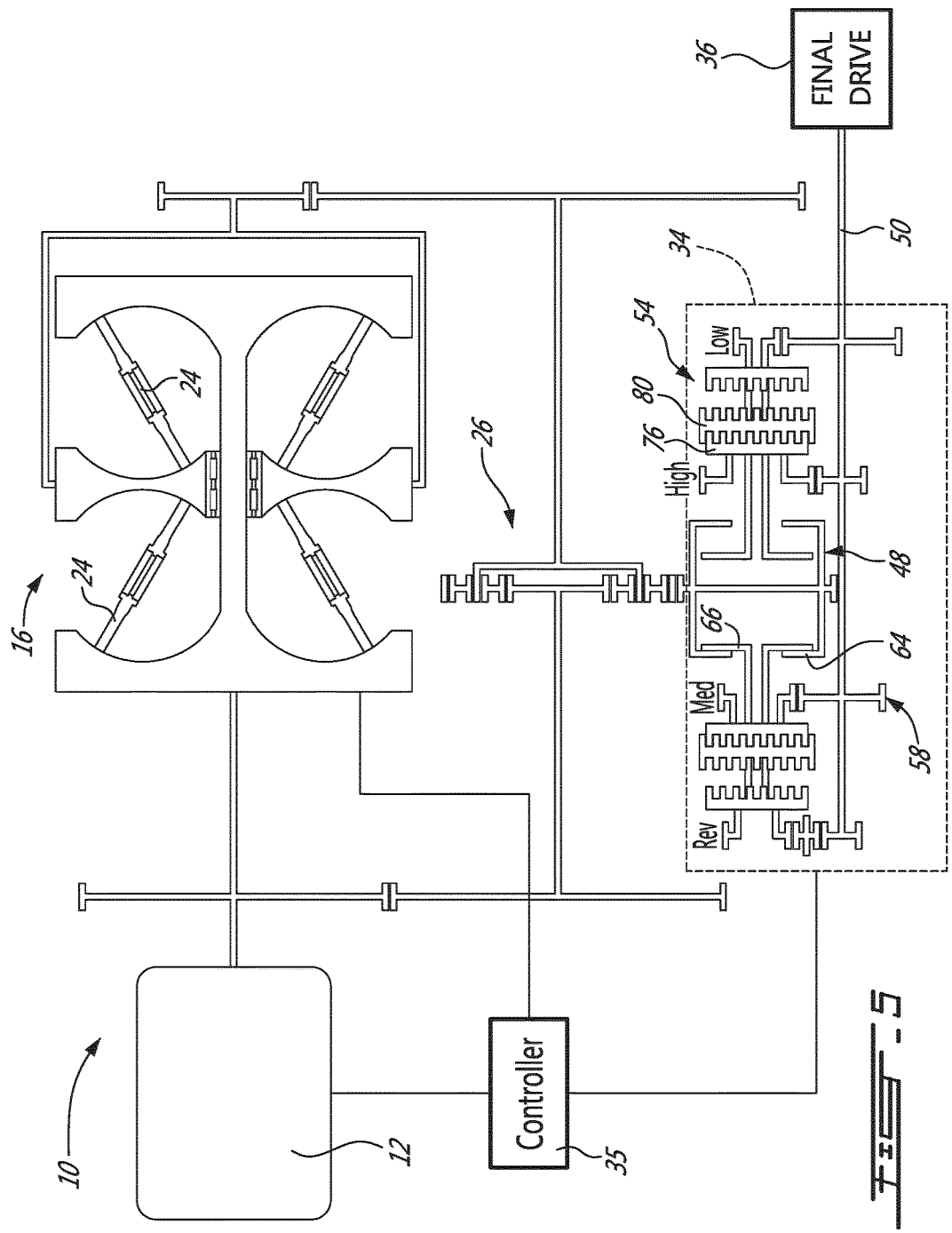
FIG. 5 is a schematic bloc diagram of the drivetrain of FIG. 1 shown at the maximal speed of the medium-speed configuration.

In FIG. 5, the rollers 24 have been moved to an overdrive position to thereby increase the speed of the output shaft 50. Since the next logical step to keep increasing the speed of the output shaft 50 is to change from the medium-speed range to the high-speed range, the movable disk 80 of the dog clutch 54 is placed in contact with the fixed disk 76 to thereby prepare for the gear change. Note that since the movable disk 66 is still engaged to the fixed disk 64, the medium-speed gear train 58 is still in operation.

The next operation is to progressively engage the movable disk 68 to the fixed disk 64 while progressively disengaging the movable disk 66 from the fixed disk 64. Since the ratio of the CVT 16 can be changed simultaneously, it is possible to achieve such a speed change without jolts.

Figure 6:
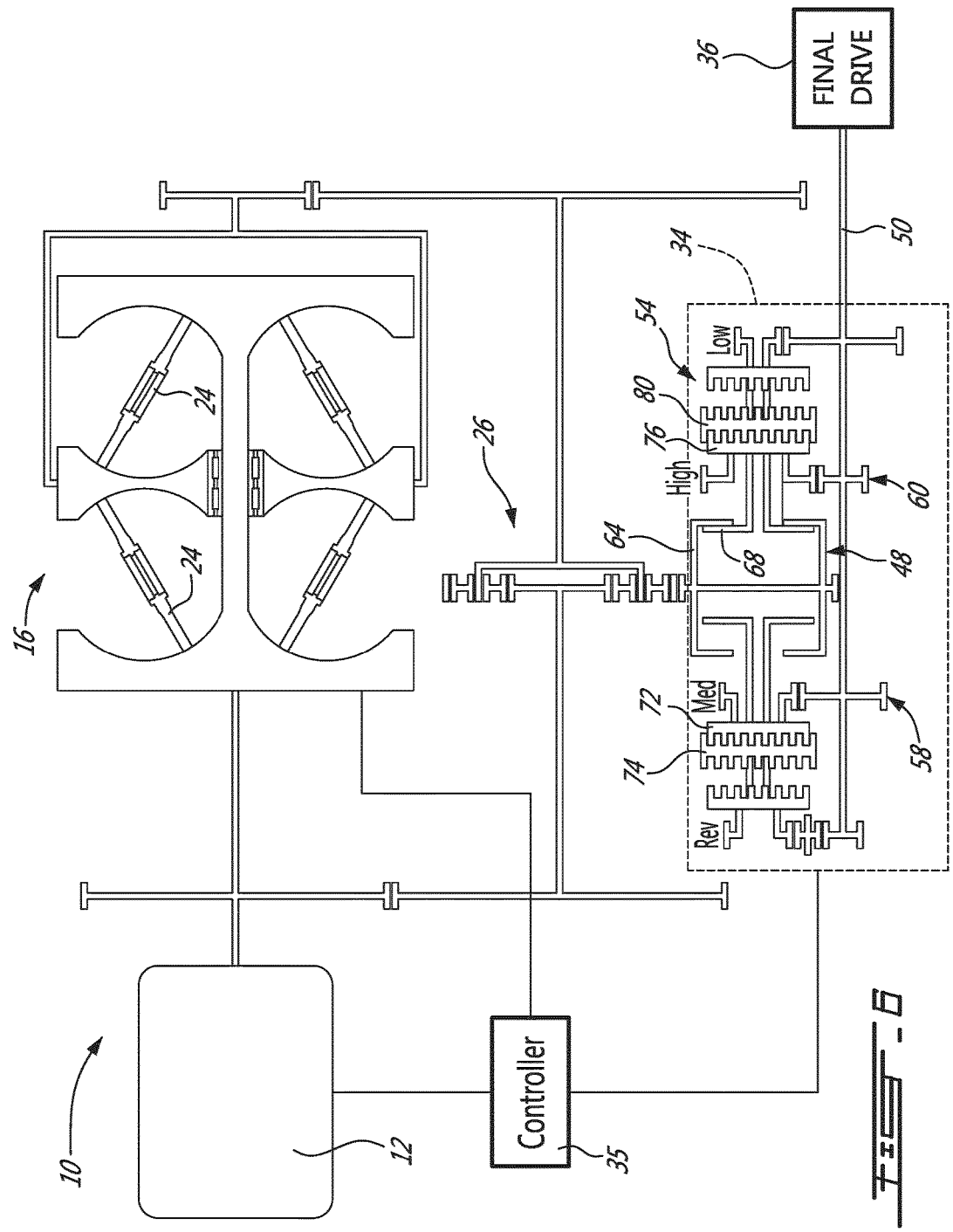
FIG. 6 is a schematic bloc diagram of the drivetrain of FIG. 1 shown in a high-speed configuration.

FIG. 6 illustrates the drivetrain 10 when it is in the high-speed mode. The movable disk 80 is engaged to the fixed disk 78, the movable disk 68 is engaged to the fixed disk 64 and the rollers 24 have returned to the underdrive position. It is to be understood that the exact position of the rollers 24 depends on the speed of the vehicle and is determined by the controller. Power is thus transferred to the output shaft 50 via the high-speed gear train 60. The user may thus increase the speed of the output shaft 50 to its maximal speed by either increase the speed of the prime mover 12 and/or changing the ratio of the CVT by changing the position of the rollers 24.

In other words, the high-speed gear train 60 is so configured as to selectively provide, in cooperation with the CVT 16, a third secondary continuous gear ratio between the output of the prime mover 12 and the final shaft 50.

It is to be noted that it is interesting to keep the movable disk 74 in connection with the fixed disk 72 since the next step could be to reduce the speed to a level where the medium-speed gear train 58 is advantageous to engage.

Figure 7:
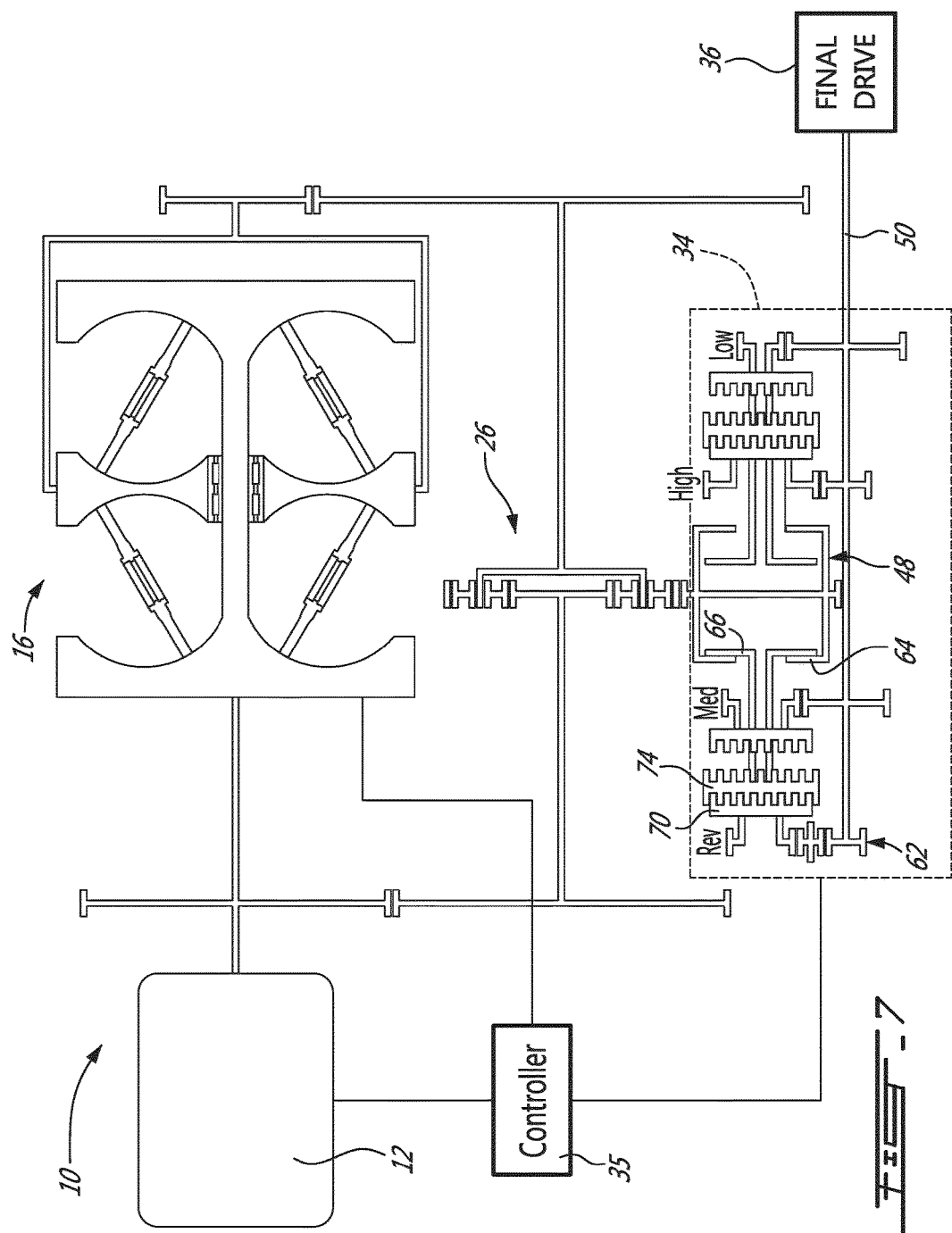
FIG. 7 is a schematic bloc diagram of the drivetrain of FIG. 1 shown in a reverse direction configuration.

FIG. 7 illustrates the drivetrain 10 in the reverse mode. Indeed, the movable disk 74 is engaged to the fixed disk 70 and the movable disk 66 is engaged to the fixed disk 64. Power is thus transferred to the output shaft 50 via the reverse gear train 62.

In other words, the reverse speed gear train 62 is so configured as to selectively provide, in cooperation with the CVT 16, a fourth secondary continuous gear ratio between the output of the prime mover 12 and the final shaft 50.

It is to be noted that while the operation of the drivetrain has been described in details hereinabove with reference to FIGS. 2 to 7, other sequence of operations of the mechanical components of the drivetrain could be achieved.

One skilled in the art will understand that the controller 35 is linked to the various mechanical elements of the drivetrain 10 such as the prime mover, the clutches, the dog clutches and the CVT to properly control the drivetrain 10.

It is to be noted that it is believed within the reach of one skilled in the art to determine the various gear ratios of the gear trains of the drivetrain 10 according to the use of the drivetrain 10.

One skilled in the art will understand that the drivetrain 10 has been schematically illustrated herein and described hereinabove. Furthermore, many changes could be done to the drivetrain 10. As non-limiting examples, the interconnection of the various inputs and output of the mixer 26 could be different or other mechanical mechanism (not shown) could be used to mix the power of the CVT and of the prime mover. Also, the dog clutches 52 and 54 could be replaced by other clutching technologies.

Figure 8:
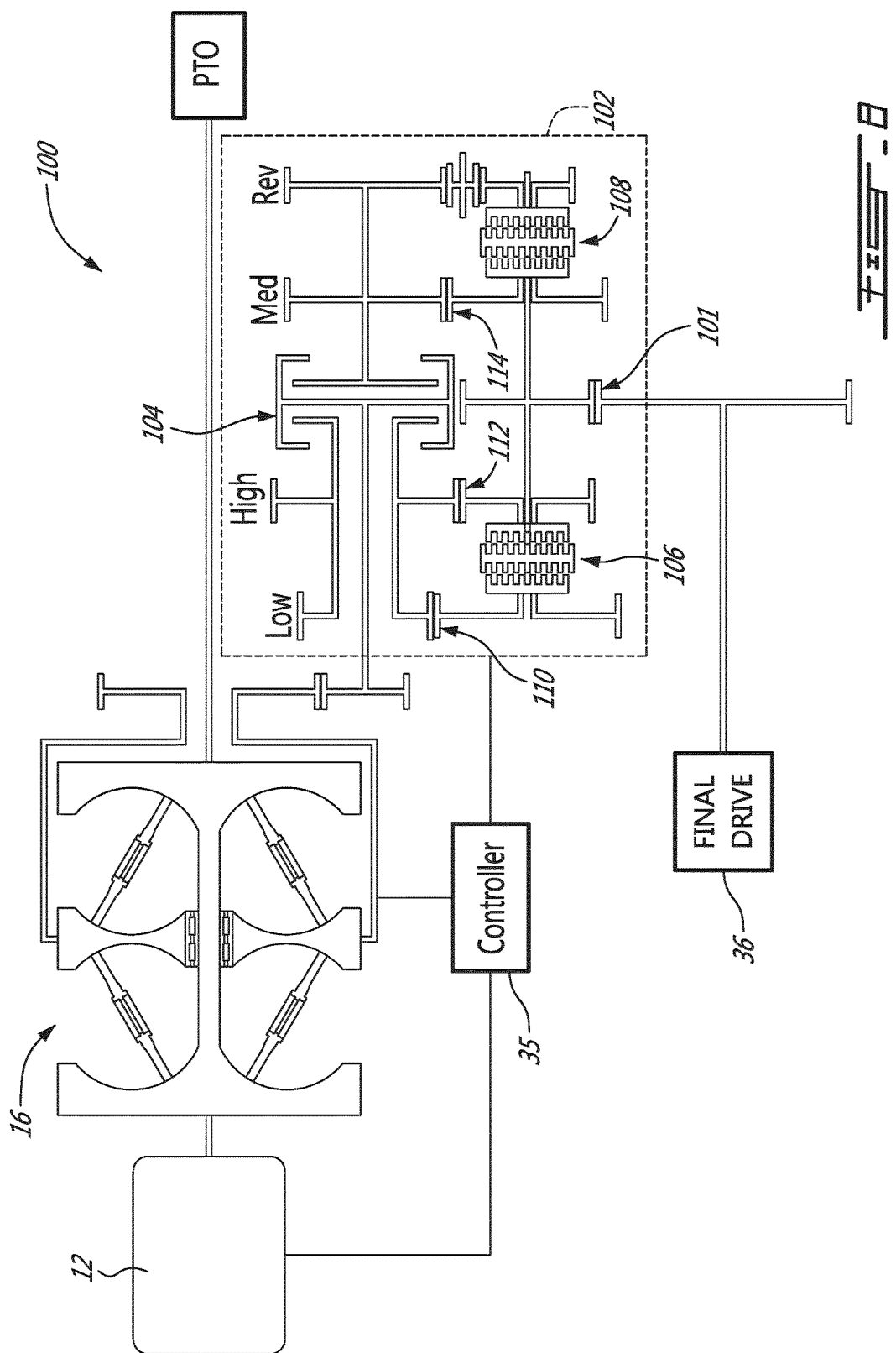
FIG. 8 is a schematic bloc diagram of a drivetrain including a CVT according to a second illustrative embodiment.

Turning now to FIG. 8 of the appended drawings, a drivetrain 100 according to a second illustrative embodiment will be described. It is to be noted that since the drivetrain 100 and the drivetrain 10 of FIGS. 1 to 7 share many similarities, only the differences therebetween will be described hereinbelow.

Generally stated, the main differences between the drivetrains 10 and 100 reside in the lack of a mixing mechanism in the drivetrain 100, in the different configuration of the dog clutches and in the addition of a final gear train 101.

As can be clearly seen from FIG. 8, the fixed disk of the three-position clutch 104 is connected to the output of the CVT 16 but is not connected to the output of the prime mover 12. Accordingly, less mechanical parts are required. If the dog clutches 52 and 54 of the transmission 34 (FIGS. 1 to 7) are viewed as having one input connected to a respective movable disk of the three-position clutch 48 and two outputs connected to a respective gear train, the dog clutches 106 and 108 of the transmission 102 of FIG. 8 can be viewed as having two inputs connected to a respective gear train and output connected to the final gear train 101.

Indeed, the low-speed and high-speed gear trains 110 and 112 are connected to a respective fixed disk of the clutch 106 and the central, movable, disk of the clutch 106 is connected to the final gear train 101. Similarly, the medium-speed and reverse-speed gear trains 114 and 116 are connected to a respective fixed disk of the clutch 108 and the central, movable, disk of the clutch 108 is connected to the final gear train 101. As can be seen from this figure, the final gear train 101 interconnects the output of the clutches 106 and 108 to the final drive 36.

Of course, one skilled in the art will understand that since the low-speed and high-speed gear trains are connected to the same clutch 106 and the medium-speed gear train is located on another clutch 108, and since the clutches 106, 108, which may be viewed as a second selecting mechanism are cascading from the clutch 104, which may be viewed as a first selection mechanism, the operation of the transmission 100 is similar to the operation of the transmission 10 described hereinabove and will not be repeated herein for concision purpose.

Figure 9:
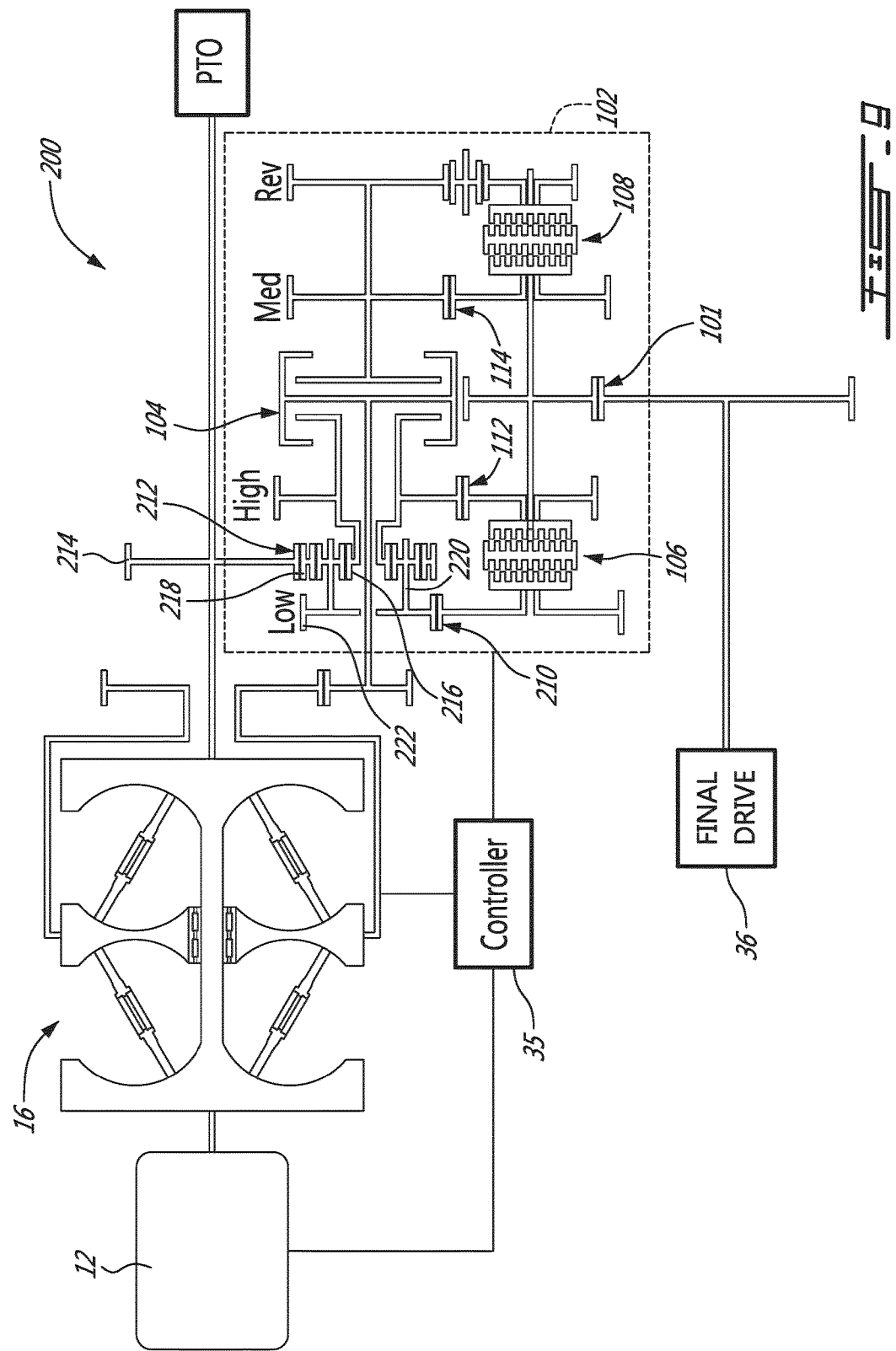
FIG. 9 is a schematic bloc diagram of a drivetrain including a CVT according to a third illustrative embodiment.
Figure 10:
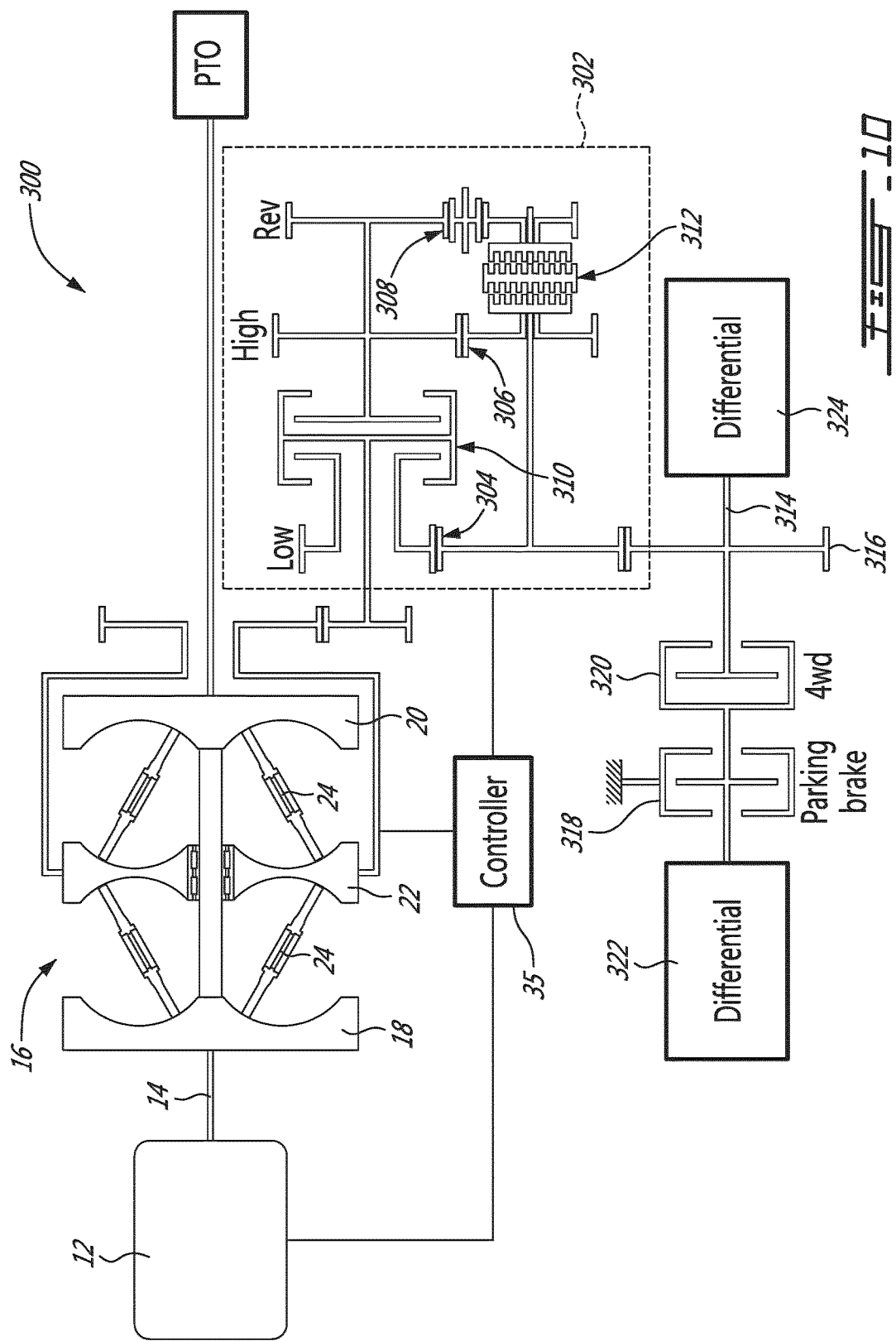
FIG. 10 is a schematic view of a drivetrain provided with a CVT according to a fourth illustrative embodiment, provided with two forward speeds and with one reverse speed, the drivetrain being shown in a neutral configuration.

Turning now to FIG. 9 of the appended drawings, a drivetrain 200 according to a third illustrative embodiment will be described. It is to be noted that since the drivetrain 200 and the drivetrain 100 of FIG. 8 share many similarities, only the differences therebetween will be described hereinbelow.

Generally stated, the main difference between the drivetrains 200 and 100 related to the low-speed gear train 210 that includes a planetary gear train 212 allowing to connect the low-speed gear train 210 to both the output of the CVT 16 via the clutch 104 and to the output of the prime mover 102 via gear 214.

More specifically, the planetary gear train 212 includes a sun 216 connected to the clutch 104, a ring 218 meshed with the gear 214 and a planet carrier 220 connected to the gear 222 of the low-speed gear train 210.

Accordingly, one skilled in the art will understand that the low speed can be viewed as an ultra low-speed since, depending on the speed differential between the prime mover 12 and the output of the CVT 16, a zero forward speed can be achieved.

As mentioned hereinabove, it is believed that one skilled in the art one skilled in the art will understand that since the low-speed and high-speed gear trains are connected to the same clutch 106 and the medium-speed gear train is located on another clutch 108, and since the clutches 106, 108, which may be viewed as a second selecting mechanism are cascading from the clutch 104, which may be viewed as a first selection mechanism, the operation of the transmission 200 is similar to the operation of the transmission 10 described hereinabove and will not be repeated herein for concision purpose.

Turning finally to FIGS. 10 to 15 of the appended drawings, a drivetrain 300 according to a fourth illustrative embodiment will be described. It is to be noted that since the drivetrain 200 and the drivetrain 100 of FIG. 8 share many similarities, only the differences therebetween will be described hereinbelow.

Generally stated, the main difference between the drivetrains 300 and 100 related to the number of forward speeds present. Indeed, the gearbox 302 includes low and high speeds but lacks a medium speed.

More specifically, the gearbox 302 is provided with a low-speed gear train 304, a high-speed gear train 306, a reverse speed gear train 308, a three-way friction clutch 310 and a three-way dog clutch 312. As will be understood by one skilled in the art, the three-way friction clutch 310 and the dog clutch 312 may be viewed as two cascading selection mechanisms.

The output of the gearbox 302 is connected to a final shaft 314 via a gear 316. The final shaft 314 may be viewed as the input of a final drive of the vehicle. Depending on the type of vehicle, the final drive may include an optional parking brake 318, an optional four-wheel drive clutch 320 and a pair of differentials 322, 324.

Turning now to FIGS. 11 to 15 of the appended drawings, the operation of the drivetrain 300 will be described.

Figure 11:
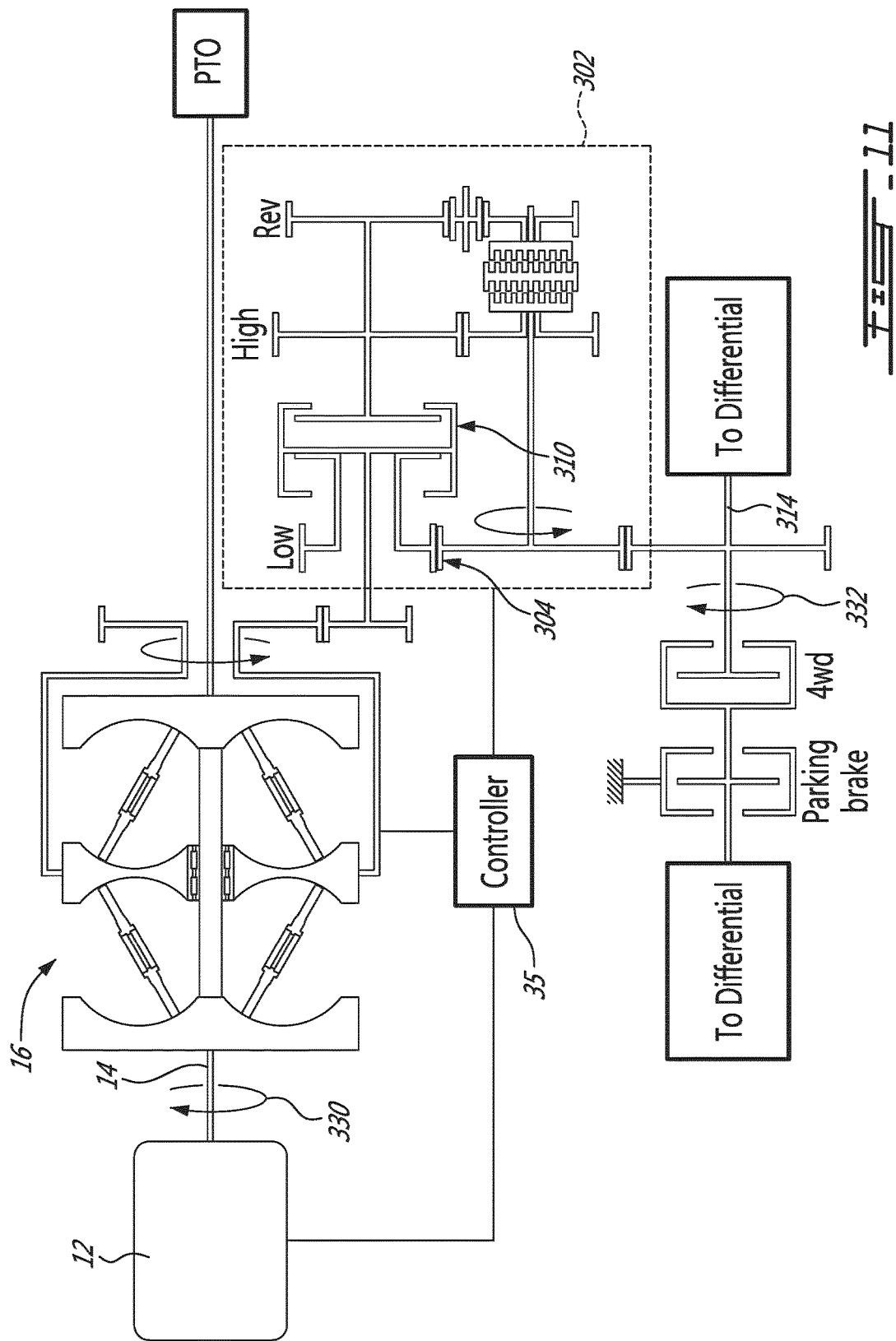
FIG. 11 illustrates the drivetrain of FIG. 10 in a low speed configuration.

FIG. 11 illustrates the drivetrain 300 in a low forward speed configuration. More specifically, the friction clutch 310 is so controlled by the controller 35 that power is transferred from the output of the CVT 16 to the final shaft 314 via the low speed gear train 304.

As can be seen from this figure, the rotation direction of the engine shaft 14 (see arrow 330) and the rotation direction of the final shaft 58 (see arrow 332) are identical.

In other words, the low speed gear train 304 is so configured as to selectively provide, in cooperation with the CVT 16, a first secondary continuous gear ratio between the output of the prime mover 12 and the final shaft 314.

Figure 12:
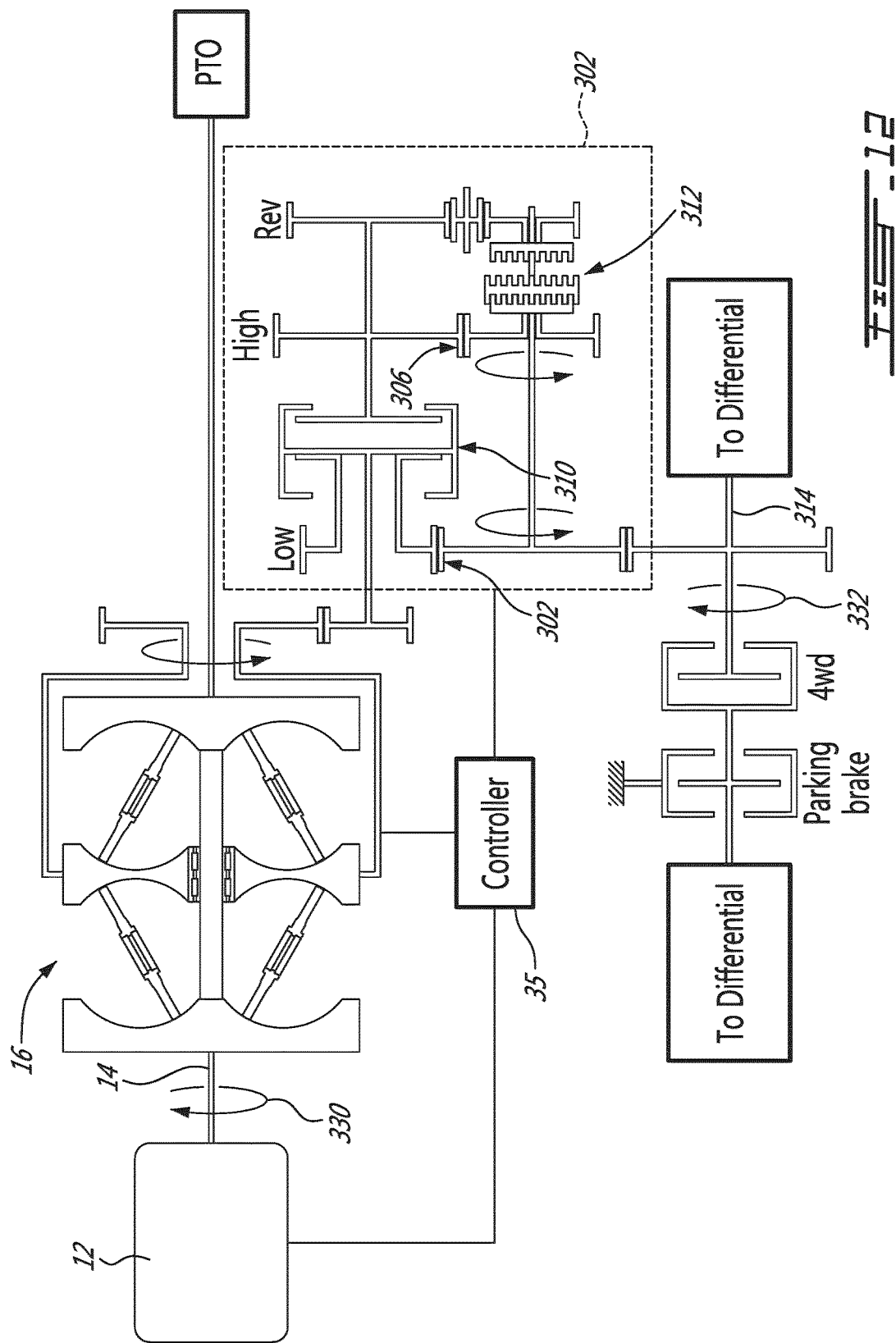
FIG. 12 illustrates the drivetrain of FIG. 10 in a low speed configuration and in anticipation to a high speed change.

FIG. 12 illustrates the drivetrain 300 in the low speed configuration of FIG. 11 and with the gearbox 302 ready to switch to the high-speed mode. Indeed, the dog clutch 312 has been so controlled by the controller 35 to be ready for a high-speed gear change. This configuration is done when the controller 35 determines that the next configuration change of the drivetrain 300 will likely be to go from the low-speed mode to the high-speed mode. This happens, for example, should the controller detect that the speed of the vehicle is increasing while the drivetrain is in low-speed mode.

Figure 13:
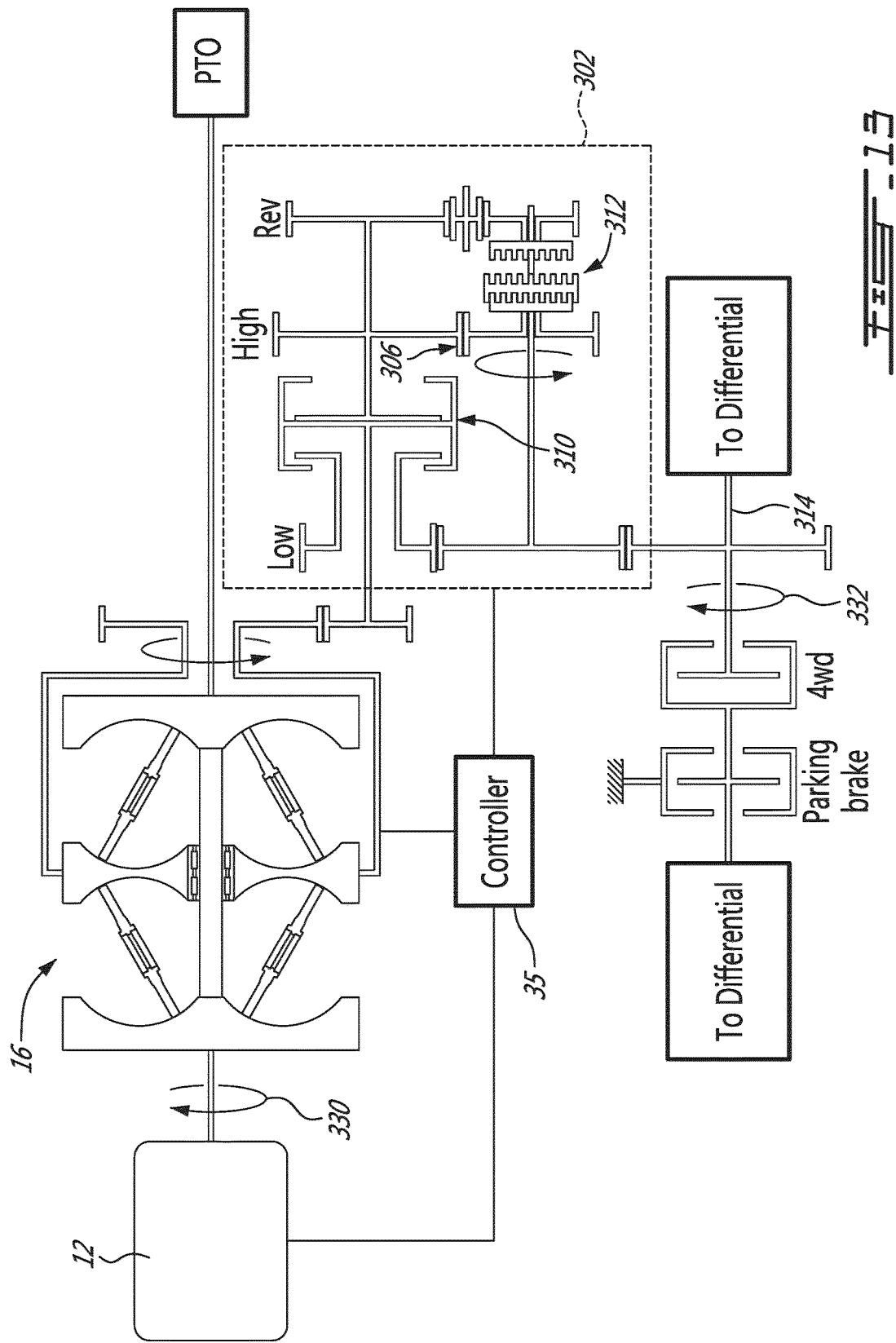
FIG. 13 illustrates the drivetrain of FIG. 10 in a high speed configuration.

FIG. 13 illustrates the drivetrain 300 in a high-speed configuration. More specifically, the friction clutch 310 and the dog clutch 312 are so controlled by the controller 35 that the power is transferred from the output of the CVT 16 to the final shaft 314 via the high-speed gear train 306.

As can be seen from this figure, the rotation direction of the engine shaft 14 (see arrow 330) and the rotation direction of the final shaft 314 (see arrow 332) are identical.

In other words, the high-speed gear train 306 is so configured as to selectively provide, in cooperation with the CVT 16, a second secondary continuous gear ratio between the output of the prime mover 12 and the final shaft 314.

Figure 14:
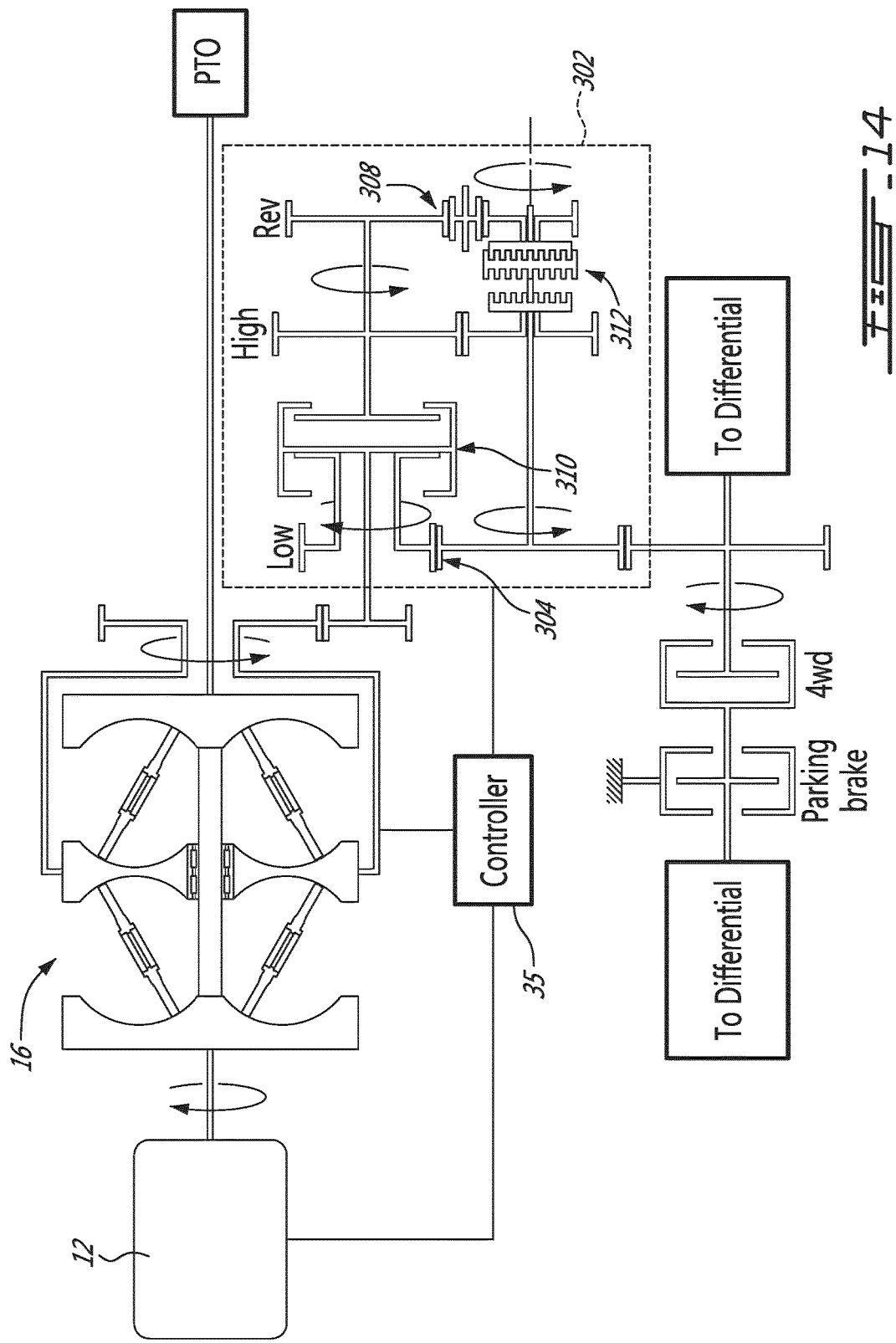
FIG. 14 illustrates the drivetrain of FIG. 10 in a low speed configuration and in anticipation to a reverse direction change.

FIG. 14, which is similar to FIG. 12, illustrates the drivetrain 300 in the low speed configuration with the gearbox 302 ready to switch to the reverse mode.

Indeed, the dog clutch 312 has been so controlled by the controller 35 as to be ready for a reverse speed gear change. This configuration is done when the controller 35 determines that the next likely configuration change of the drivetrain 300 will be to go from the low-speed mode to the reverse mode. This happens, for example, should the controller detect that the speed of the vehicle is decreasing while the drivetrain is in low speed mode.

Figure 15:
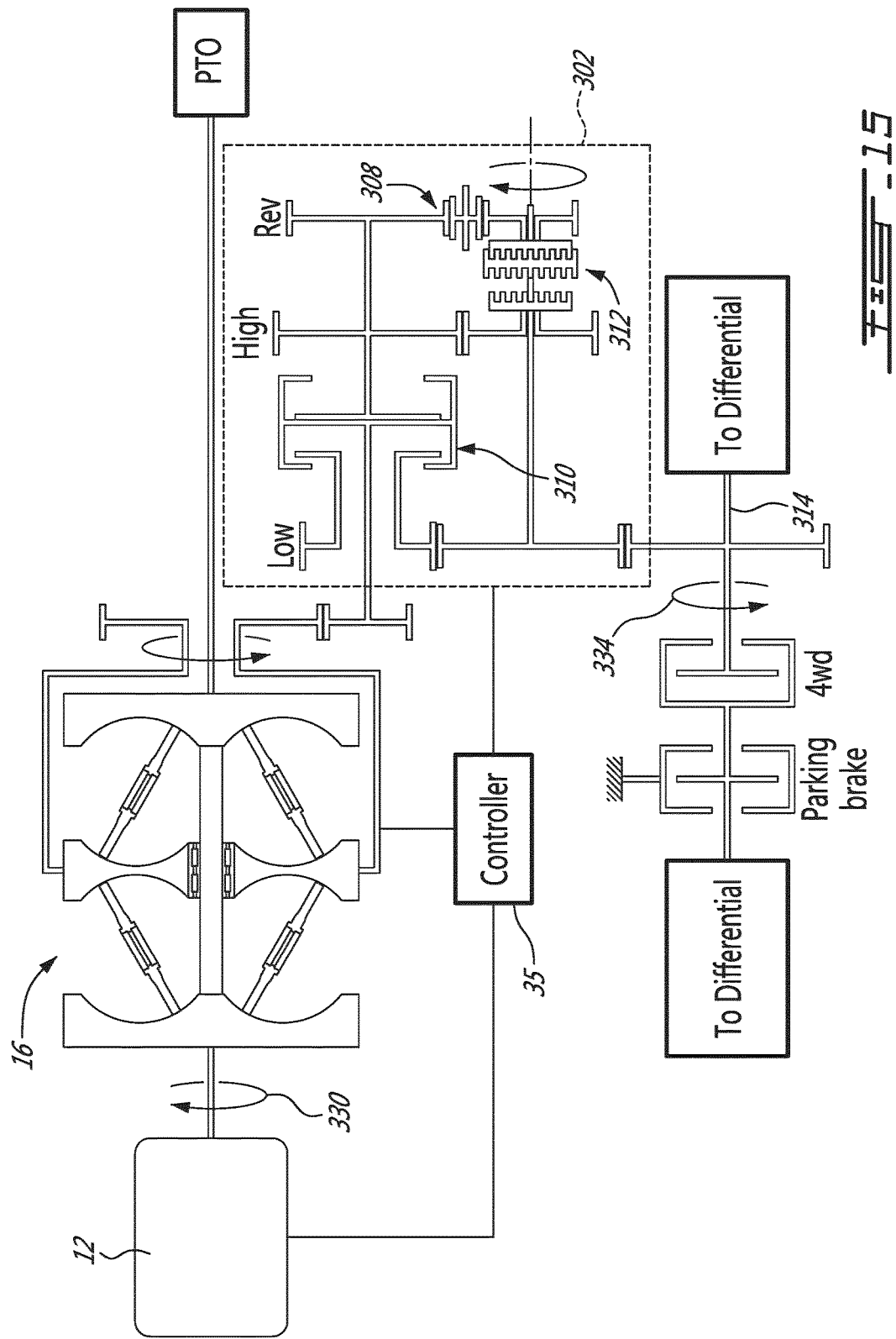
FIG. 15 illustrates the drivetrain of FIG. 10 in a reverse configuration.

FIG. 15 illustrates the drivetrain 300 in a reverse speed configuration. More specifically, the friction clutch 310 and the dog clutch 312 are so controlled that power is transferred from the output of the CVT 16 to the final shaft 314 via the reverse speed gear train 308.

As can be seen from this figure, the rotation direction of the engine shaft 14 (see arrow 330) and the rotation direction of the final shaft 58 (see arrow 334) are opposed.

In other words, the reverse gear train 308 is so configured as to selectively provide, in cooperation with the CVT 16, a third secondary continuous gear ratio between the output of the prime mover 12 and the final shaft 314.

It is to be understood that the drivetrain provided with a CVT is not limited in its application to the details of construction and parts illustrated in the accompanying drawings and described hereinabove. The drivetrain provided with a CVT is capable of other embodiments and of being practiced in various ways. It is also to be understood that the phraseology or terminology used herein is for the purpose of description and not limitation. Hence, although the drivetrain provided with a CVT has been described hereinabove

What is claimed is:

1. A drivetrain for connection between the output of a prime mover and the input of a final drive; the drivetrain comprising:
a CVT including an input connected to the output of the prime mover and an output;
a transmission having an input connected to the output of the CVT and an output connectable to the input of the final drive; the transmission including first and second cascading selection mechanisms provided between the input of the transmission and the input of the final drive;
wherein the first and second cascading selection mechanisms are so configured and controlled that the position of the second selection mechanism can be changed by the controller depending on the next desirable configuration.

2. A drivetrain as recited in claim 1, wherein the first selection mechanism includes a three-position friction clutch including an input and first and second outputs.

3. A drivetrain as recited in claim 1, wherein the second selection mechanism includes first and second clutches, each including an input connected to a respective output of the first selection mechanism.

4. A drivetrain as recited in claim 3, wherein the first and second clutches are dog clutches.

5. A drivetrain as recited in claim 3, wherein the first and second clutches of the second selection mechanism each include first and second outputs connected to a respective gear train.

6. A drivetrain as recited in claim 5, wherein the first and second outputs of the first clutch of the second selection mechanism are respectively connected to a low-speed gear train and to a high-speed gear train and wherein the first and second outputs of the second clutch of the second selection mechanism are respectively connected to a medium-speed gear train and to a reverse-speed gear train.

7. A drivetrain as recited in claim 6, wherein each of the low-speed, medium-speed, high-speed and reverse gear trains include an output connected to the final drive.

8. A drivetrain as recited in claim 1, wherein the second selection mechanism includes a) a first clutch including first and second inputs connected to a first output of the first selection mechanism via a low-speed gear train and a high-speed gear train, respectively and b) a second clutch including first and second inputs connected to a second output of the first selection mechanism via a medium-speed gear train and a reverse-speed gear train, respectively.

9. A drivetrain as recited in claim 8, wherein the first and second clutches are dog clutches.

10. A drivetrain as recited in claim 8, wherein the low-speed gear train is a planetary gear train having a first input connected to the first output of the three-position friction clutch, a second input connected to the output of the prime mover and an output.

11. A drivetrain as recited in claim 1, wherein the transmission further comprises a power mixer having a first input connected to the output of the CVT, a second input connected to the output of the prime mover and an output connected to an input of the first selection mechanism.

12. A drivetrain as recited in claim 11, wherein the power mixer includes a planetary gear train.

13. A drivetrain as recited in claim 2, wherein the first output of the three-position friction clutch is connected to the input of the final drive via a low-speed gear train; and wherein the second selection mechanism includes a three-position clutch having first and second inputs and an output connected to the input of the final drive; the first input being connected to the second output of the three-position friction clutch via a high-speed gear train and the second input being connected to the second output of the three-position friction clutch via a reverse speed gear train.

14. A drivetrain for connection to the output of a prime mover and to the input of a final drive therebetween; the drivetrain comprising:
a CVT including an input coupled to the output of the prime mover and an output; the CVT being so configured as to provide, between the input and output thereof, a primary continuous range of gear ratios;
a transmission including:
a first selection mechanism including an input connected to the output of the CVT and first and second outputs;
a first gear train connected between the first output of the first selection mechanism and the input of the final drive, the first gear train being so configured as to selectively provide, in cooperation with the CVT, a first secondary continuous gear ratio between the output of the prime mover and the input of the final drive;
a second selection mechanism including first and second inputs and an output connected to the final drive;
a second gear train connected between the second output of the first selection mechanism and the first input of the second selection mechanism, the second gear train being so configured as to selectively provide, in cooperation with the CVT, a second secondary continuous gear ratio between the output of the prime mover and the input of the final drive; and
a third gear train connected between the second output of the first selection mechanism and the second input of the second selection mechanism, the third gear train being so configured as to selectively provide, in cooperation with the CVT, a third secondary continuous gear ratio between the output of the prime mover and the input of the final drive.

15. A drivetrain for connection to the output of a prime mover and to the input of a final drive therebetween; the drivetrain comprising:
a CVT including an input coupled to the output of the prime mover and an output; the CVT being so configured as to provide, between the input and output thereof, a primary continuous range of gear ratios;
a gearbox including:
a first selection mechanism including an input connected to the output of the CVT and first and second outputs;
a second selection mechanism including first and second clutches each having an input connected to a respective output of the first selection mechanism and an first and second outputs;
a first gear train connected between the first output of the first clutch and the input of the final drive, the first gear train being so configured as to selectively provide, in cooperation with the CVT, a first secondary continuous gear ratio between the output of the prime mover and the input of the final drive;
a second gear train connected between the second output of the first clutch and input of the final drive, the second gear train being so configured as to selectively provide, in cooperation with the CVT, a second secondary continuous gear ratio between the output of the prime mover and the input of the final drive;

a third gear train connected between the first output of the second clutch and the input of the final drive, the third gear train being so configured as to selectively provide, in cooperation with the CVT, a third secondary continuous gear ratio between the output of the prime mover and the input of the final drive; and a fourth gear train connected between the second output of the second clutch and the input of the final drive, the third gear train being so configured as to selectively provide, in cooperation with the CVT, a fourth secondary continuous gear ratio between the output of the prime mover and the input of the final drive.

* * * * *